United States Patent [19]

Thorn

[11] Patent Number: 5,191,944
[45] Date of Patent: Mar. 9, 1993

[54] DEVICE FOR DRESSING A LAWN

[76] Inventor: Howard R. Thorn, 169 Liberty Hill Rd., Lexington, S.C. 29073

[21] Appl. No.: 748,185

[22] Filed: Aug. 21, 1991

[51] Int. Cl.⁵ .......................................... A01B 59/043
[52] U.S. Cl. ............................. 172/445.1; 172/684.5
[58] Field of Search ..................... 172/445.1, 32, 199, 172/197, 612, 684.5; 14/901

[56] References Cited

U.S. PATENT DOCUMENTS

| | | | |
|---|---|---|---|
| 1,035,000 | 8/1912 | Grünewald et al. | 172/612 |
| 1,530,329 | 3/1925 | Roberts . | |
| 1,775,316 | 9/1930 | McLeod et al. | 172/612 |
| 2,227,874 | 1/1941 | Bartsch | 172/612 |
| 2,983,060 | 5/1957 | Rosselot | 37/171 |
| 3,263,755 | 8/1966 | Zink | 172/612 |
| 3,556,228 | 1/1971 | Mork | 172/199 |
| 4,196,778 | 4/1980 | Smith | 172/199 |
| 4,836,295 | 6/1989 | Estes | 172/197 |
| 4,886,124 | 12/1989 | Kleinhuizen | 172/32 |
| 4,924,945 | 5/1990 | Mork | 172/445.1 |

FOREIGN PATENT DOCUMENTS

| | | | |
|---|---|---|---|
| 35167 | 4/1886 | Fed. Rep. of Germany | 172/612 |
| 446508 | 4/1936 | United Kingdom | 172/684.5 |
| 640312 | 7/1950 | United Kingdom | 172/684.5 |
| 849677 | 9/1960 | United Kingdom | 172/445.1 |

Primary Examiner—Andrew V. Kundrat
Assistant Examiner—Spencer Warnick
Attorney, Agent, or Firm—Michael A. Mann

[57] ABSTRACT

A device for dressing the contours of a lawn by moving dirt from high spots to low spots, comprising a frame with a grid attached to the frame and held in direct engagement with the surface of the lawn while being pulled by a vehicle. The grid has a plurality of elements forming an interlocking network that defines a multiplicity of holes. Each element has two surfaces that meet at an angle to form a dirt-scraping edge, moving some dirt upwardly into the bed of the grid. The dirt is moved with the grid until the grid is over a low spot whereupon the dirt will be deposited through the holes. The grid may optionally be attached to two or more brackets and bolted to the frame as a replaceable cartridge. The frame preferably accommodates a standard three-point hitch.

2 Claims, 2 Drawing Sheets

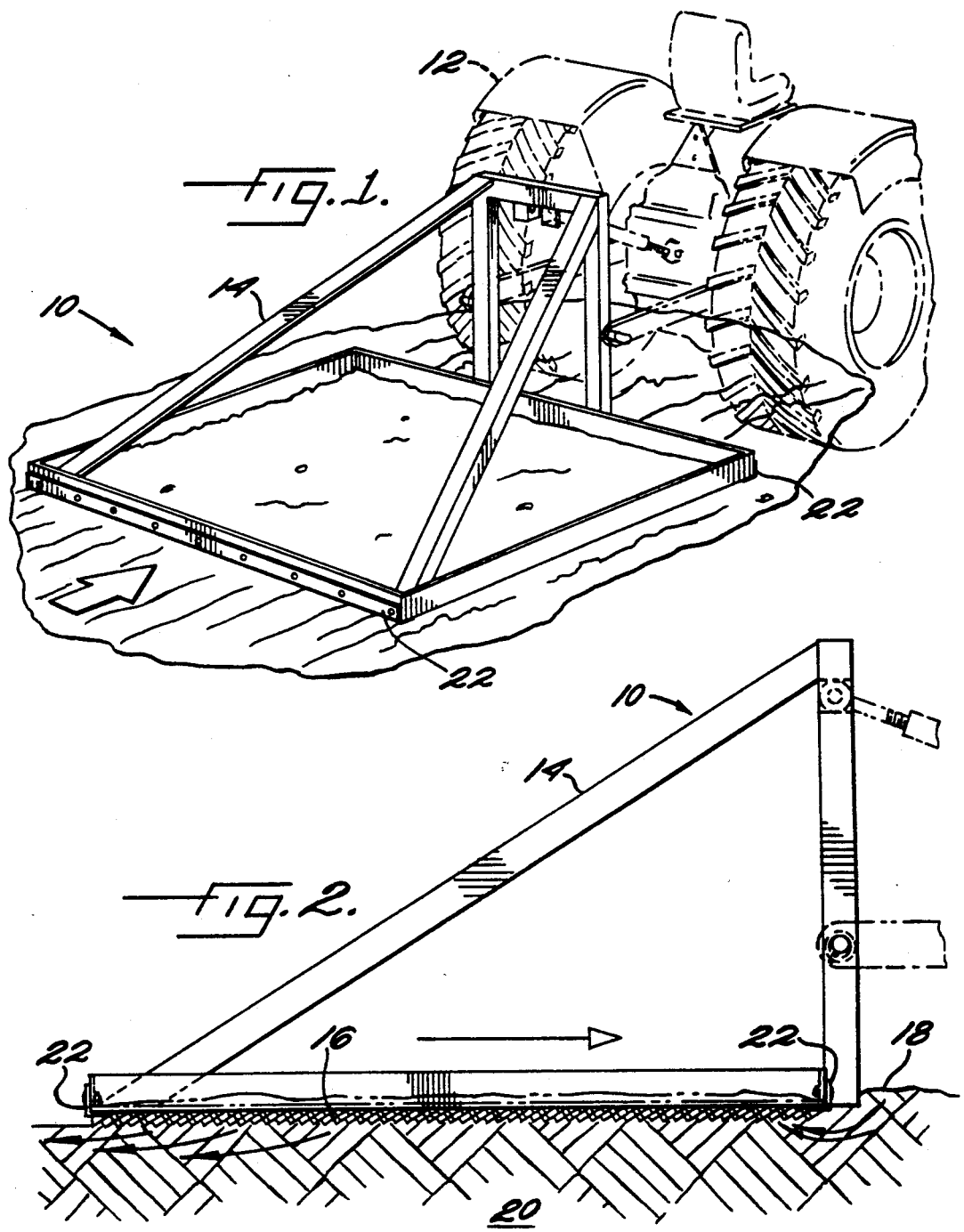

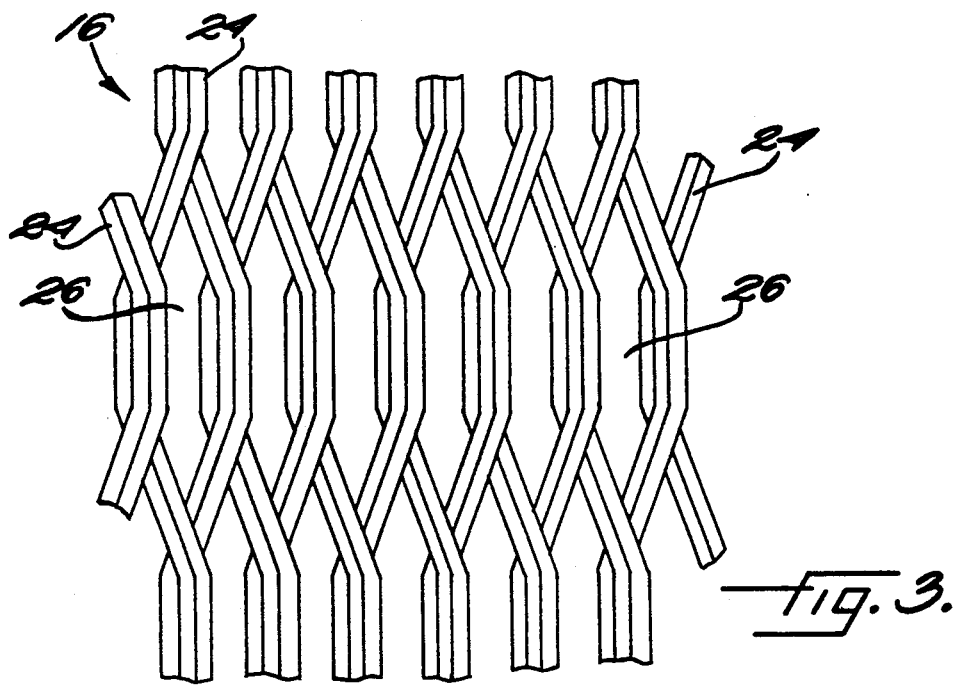
fig. 3.
fig. 4.
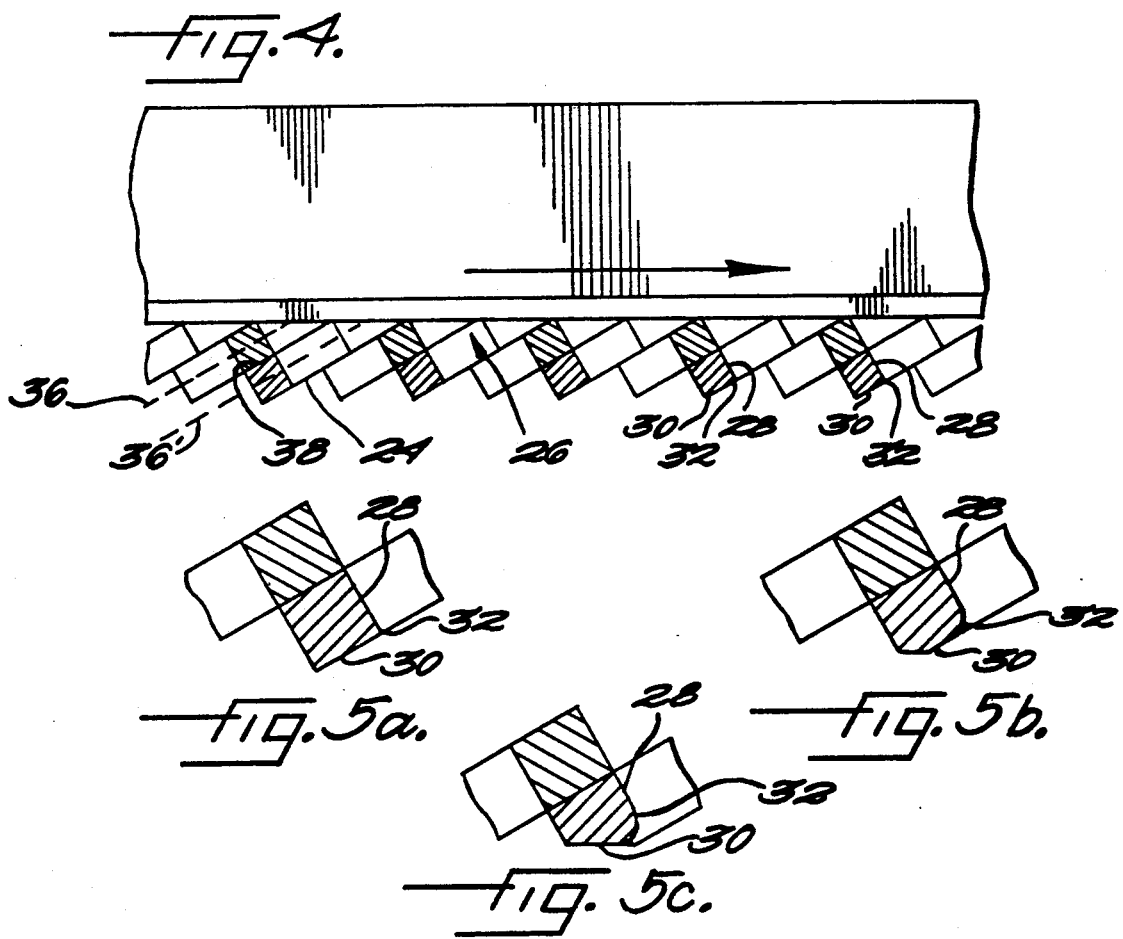
fig. 5a. fig. 5b.
fig. 5c.

DEVICE FOR DRESSING A LAWN

BACKGROUND OF THE INVENTION

1. Field of the Invention

The present invention relates to devices for dressing a lawn. In particular, the present invention is a device for modifying the contours of a lawn by removing high spots and raising low spots in the lawn, to the extent desired and in a gradual but effective way.

2. Discussion of Background

When establishing a lawn, it is desirable to have either a flat lawn or a lawn that is not uneven but has gentle contours that will not result in excessive erosion during a heavy rain. Sometimes, a lawn is "dressed"; that is, the objectionable degree of unevenness in the lawn contours is removed by raking or scraping the dirt that forms the "spots", where the lawn has a small, local ridge or mound, to the "low spots", ruts or small local depressions in the surface of the lawn.

In addition to hand rakes, there are several devices that can be used to dress a lawn. See, for example, the devices of Kleinhuizen in U.S. Pat. No. 4,886,124; Smith, in U.S. Pat. No. 4,196,788; Mork, in U.S. Pat. No. 3,556,228; Rosselot, in U.S. Pat. No. 2,983,060; and Roberts, et al., in U.S. Pat. No. 1,530,329. Most of these have one or more scraping bars mounted to a frame that engage the dirt of the high spots head on and, of necessity, with considerable force. The last of these, the device of Roberts, et al. is a flexible mat made of interlocked metal elements for dragging across a lawn.

None of the prior art devices applies a reasonable amount of force for dressing a lawn so that small amounts of dirt are effectively shifted from high spots to low without damage to the basic contours.

SUMMARY OF THE INVENTION

According to its major aspects and broadly stated, the present invention is a device for dressing a lawn having high spots and low spots in its contours. The device comprises, in the main, a frame and a grid attached to the frame. The grid is formed of an interlocking network of elements that define a multiplicity of holes. Each element has two adjacent surfaces that meet at an angle to form an edge that is oriented in the direction of travel when the frame is pulled forward by a vehicle, such as a small tractor. Furthermore, each element lies in a separate plane, adjacent elements touching at intervals and begin attached integrally or by welding where they touch. The grid is held by the frame in direct engagement with the ground, without any feature of the frame between the grid and the ground, so that the elements can scrape dirt from the high spots to the low spots.

A major feature of the present invention is the grid. The grid is formed in such a way that the edge leads the element in its engagement with the dirt, and, as it wears, the edge tends to sharpen itself as the surfaces that form the edge wear away from abrasion. The grid is rigid enough, because of the material of which it is made and its interlocking, multi-plane structure, to provide effective scraping yet does not scrape excessive amounts of dirt. Therefore, gentle contours can remain, while gross unevenness is eliminated. Walkway grating is a preferred material for a grid and is readily available in widths that are convenient for use. Preferably, the grid is attached to two angle irons, and the latter bolted to the frame to form a releasable cartridge, for circumstances wherein the device is to be placed into frequent use, such as at a golf course or other large, landscaped areas, and therefore more likely to wear out, rather than for occasional home use, wherein a cartridge may simply be unnessesary if the gauge of steel comprising the grid is relatively heavy.

Another feature of the present invention is the frame which is designed to be attachable to a small tractor or other vehicle so that it can be put into engagement with the lawn surface and pulled. A standard three-point hitch-type attachment is preferred.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a device according to a preferred embodiment of the present invention;

FIG. 2 is a side view of the device according to a preferred embodiment of the present invention;

FIG. 3 is a detailed, perspective view of the grid according to the present invention;

FIG. 4 is a detailed side view of the grid and frame according to the present invention; and FIGS. 5a, 5b, and 5c illustrate the self-sharpening feature of a grid element according to a preferred embodiment of the present invention.

DETAILED DESCRIPTION OF A PREFERRED EMBODIMENT

Referring now to FIGS. 1 and 2, there is shown a device 10 according to the present invention. Device 10 is being pulled by a tractor 12, as shown, or by any vehicle to which device 10 may be attached. Device 10 has a frame 14 and a grid 16. Grid 16 is attached preferably to the underside of frame 14 so that it engages the surface 18 of lawn 20 directly, that is, substantially without any part of frame 14 lying between grid 16 and surface 18.

As illustrated in FIGS. 1 and 2, grid 16 can be attached to at least one bracket, such as an angle iron 22—two are shown—and angle iron 22 bolted to frame 14 or fastened in some equivalent, releasable way, to form a cartridge. The cartridge would then comprise angle irons 22 and grid 16 which can be unbolted from frame 14 and replaced with a new cartridge.

The preferred structure of grid 16 can be seen in more detail in FIGS. 3 and 4. Grid 16 comprises a plurality of interlocking elements 24 forming a gridwork having a multiplicity of holes 26. Each element 24 can take on a variety of cross sectional shapes, however, each element 24 will have two surfaces 28 and 30 that meet at an angle to form an edge 32. Edge 32 will be oriented so that it leads element 24 when grid 16 is moved forward. Leading element 24 means that the first portion of each element 24 to cross a plane perpendicular to the direction of travel, as indicated in FIGS. 2 and 4 by the arrows, is edge 32. Edge 32 therefore initiates the scraping, moving some dirt upwardly and some downwardly. Downward-moving dirt is resisted by the dirt of the lawn; upward-moving dirt, only by recently loosened dirt. Thus more dirt rides upwardly into the bed of grid 16. Since some high spots may be composed of looser dirt, pushing some of the dirt downwardly tends to compact such dirt. If the dirt is already compacted, it will resist the downward movement of scraped dirt. Because grid 16 is in engagement with surface 18, dirt will be dragged with grid 16 by elements 24 until a low spot provides a place for dirt to fall through holes 26.

As illustrated in FIGS. 5a, 5b, and 5c, edge 32 will gradually wear away. However, surface 30 will also wear away (and, to a more limited extent, surface 28 will wear). As surface 30 wears, it reduces the angle between surface 30 and 28, thus sharpening edge 32.

Each element 24 of grid 16 lies in a different, adjacent plane that does not intersect with that of any adjacent element (best seen in FIG. 4, where two adjacent planes are indicated by broken lines 36, 36'). When grid 16 is horizontal, each parallel adjacent plane 36, 36', is neither horizontal nor vertical but at an angle of approximately 45° as shown in FIG. 4. Elements 24 interlock, preferably integrally, but also by welding, at the segments (at 38 in FIG. 4) of adjacent elements 24 that touch. Walkway grating, made from a sheet of steel that is slit and the opposing edges of the sheet pulled or expanded in opposing directions perpendicular to the plane of the sheet to form diamond-shaped or hexagonal holes 26 makes a suitable grid. Grid 16 should be sufficiently rigid that it will not buckle in use (and may be used as a surface for hauling items such as bales of straw).

In use, the angle irons 22 of a cartridge carrying a grid 16 are bolted to frame 14 and attached, preferably, by a three-point hitch to a tractor 12. Tractor 12 lowers frame 14 so that it holds grid 16 in direct engagement with the surface 18 of lawn 20. The tractor 12 pulls grid 16 so that edge 32 scrapes dirt from high spots and deposits it on low spots. Several passes may be needed to adjust the contours of the lawn. However, dressing a lawn is a gradual process that should not be overdone.

It will be apparent to those skilled in the art that many changes and substitutions can be made to the preferred embodiment herein described without departing from the spirit and scope of the present invention as defined by the appended claims.

What is claimed is:

1. A device for towing behind a vehicle to dress a lawn, said device comprising:
    a cartridge having
        a grid made of a section of expanded metal, said grid having a first end and an opposing, second end, and
        a first angle iron,
        a second angle iron,
        said first end of said grid welded to said first angle iron and said second end of said grid welded to said second angle iron;
    a frame;
    bolts for releasably attaching said cartridge to said frame;
    means for connecting said frame to a vehicle so that said vehicle can pull said frame and said frame can hold said grid in direct engagement with the surface of said lawn.

2. The device as recited in claim 1, wherein said connecting means is a three-point hitch.

* * * * *